May 8, 1945.   W. F. CALDWELL ET AL   2,375,730
APPARATUS FOR CONDUCTING REACTIONS IN LIQUID PHASE
Filed June 6, 1942   2 Sheets-Sheet 1
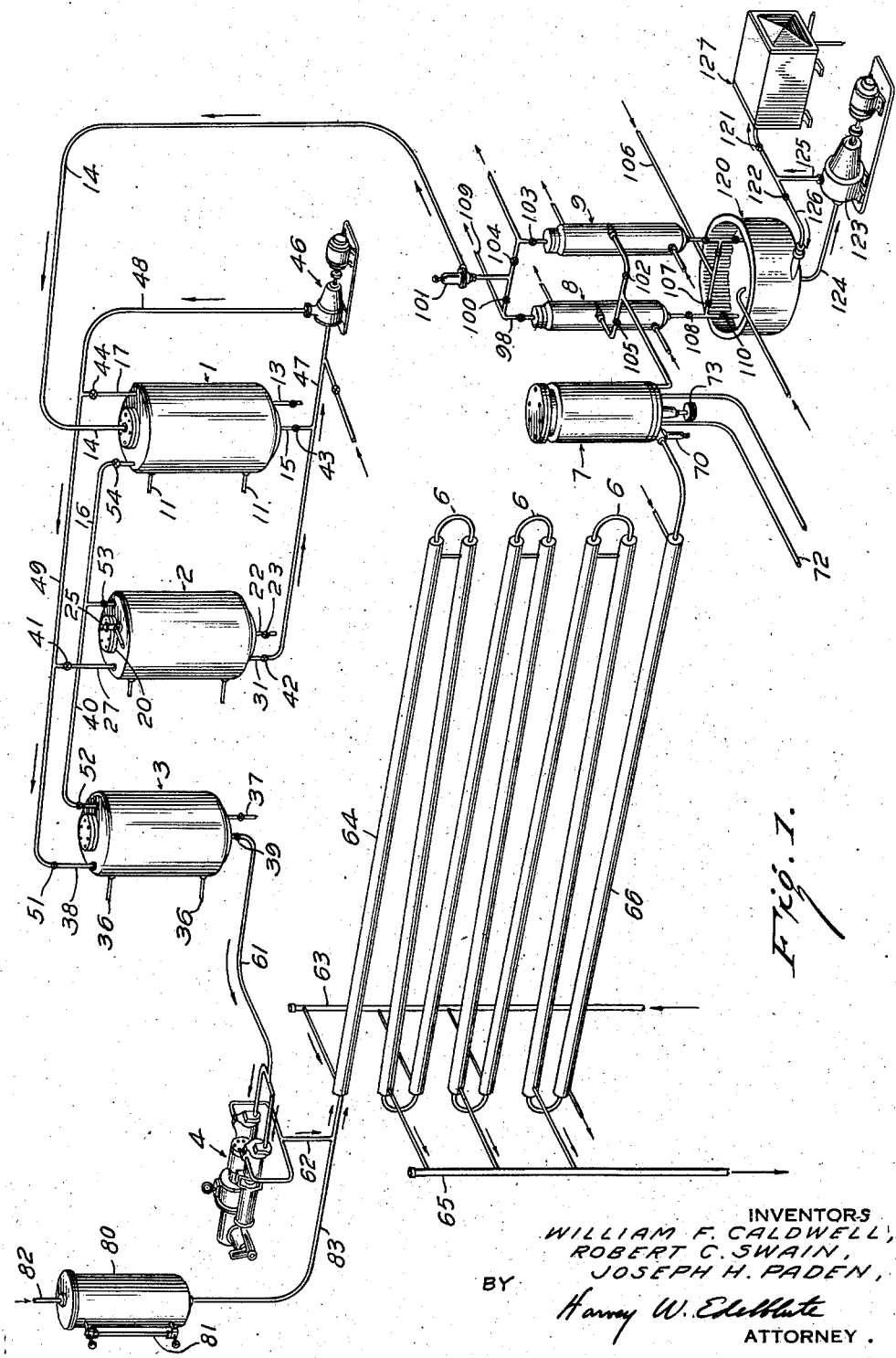
INVENTORS
WILLIAM F. CALDWELL,
ROBERT C. SWAIN,
JOSEPH H. PADEN,
BY Harvey W. Edelblute
ATTORNEY.

May 8, 1945.   W. F. CALDWELL ET AL   2,375,730
APPARATUS FOR CONDUCTING REACTIONS IN LIQUID PHASE
Filed June 6, 1942   2 Sheets-Sheet 2
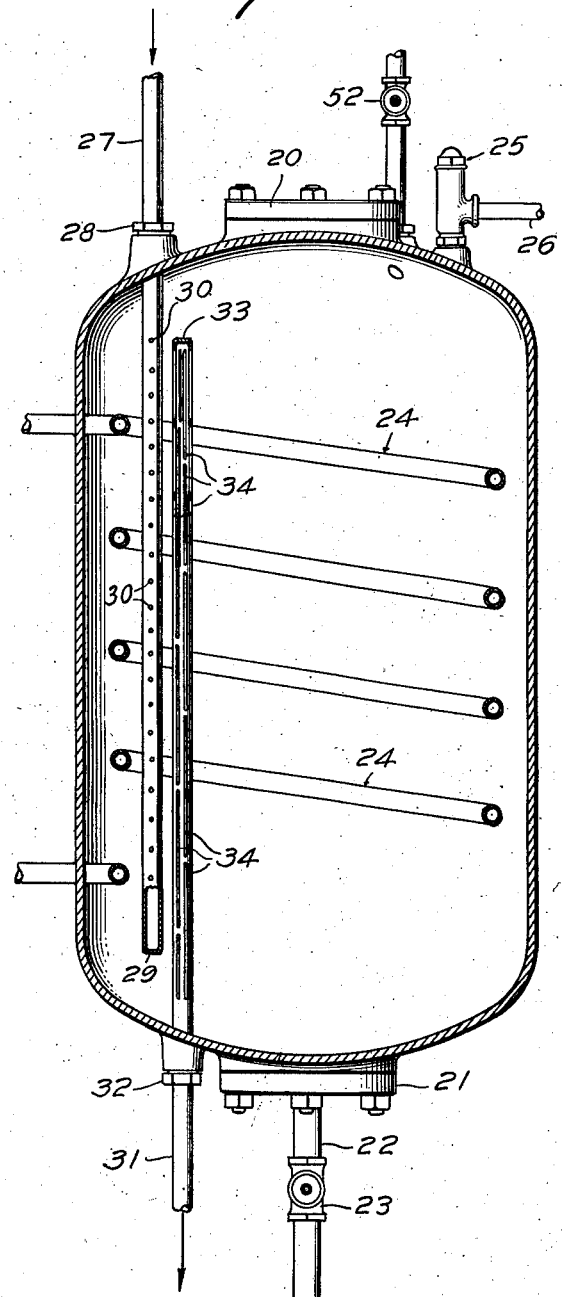
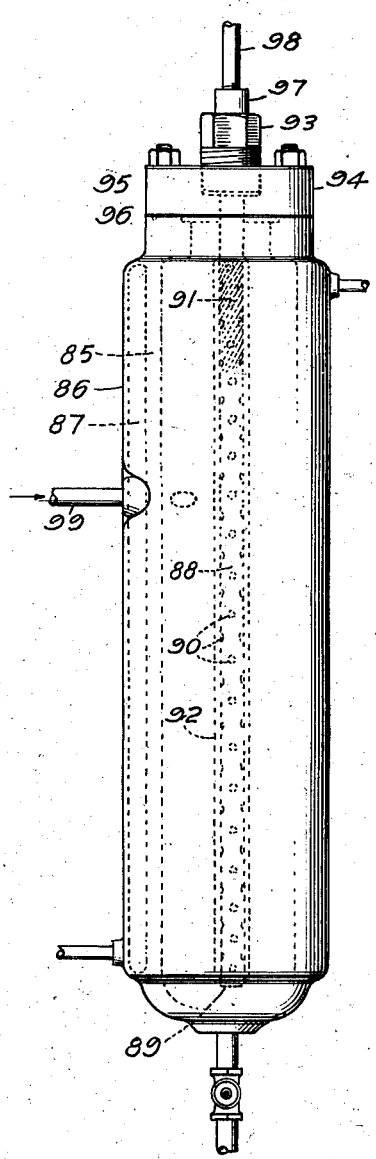
INVENTORS
WILLIAM F. CALDWELL,
ROBERT C. SWAIN,
JOSEPH H. PADEN,
BY Harvey W. Edelblute
ATTORNEY Patented May 8, 1945

2,375,730

UNITED STATES PATENT OFFICE 2,375,730

APPARATUS FOR CONDUCTING REACTIONS IN LIQUID PHASE

William F. Caldwell, Old Greenwich, Robert C. Swain, Riverside, and Joseph H. Paden, Glenbrook, Conn., assignors to American Cyanamid Company, New York, N. Y., a corporation of Maine Application June 6, 1942, Serial No. 446,156

3 Claims. (Cl. 23—260)

This invention relates to apparatus useful in carrying out chemical reactions in liquid phase being particularly adapted to operate continuously or at least substantially so. The apparatus of the present invention is also useful in carrying out reactions involving highly volatile liquids which at ordinary temperatures must be kept under pressure to keep them in liquid form.

In many chemical reactions it is desirable and in some cases necessary to carry out the reaction while keeping the reaction mixture in liquid phase; that is, in an easily flowing liquid form. When using certain common chemical reactants or solvents such as liquid ammonia, liquid $SO_2$, liquid $CO_2$, etc., which have very low boiling points it is necessary to keep the reaction mixture under pressure to maintain these chemicals in a liquid form at normal room temperature. When employing other highly volatile solvents or reactants at elevated temperatures it is also generally necessary to keep the reaction mixture under pressure to prevent vaporization of the volatile constituents of the reaction mixture. Keeping the solvent from boiling away is necessary in those reactions in which a reaction product is formed, precipitated from its mother liquor and separated therefrom by filtration. This is particularly important where unreacted constituents remain in the liquid since evaporation of their solvents would cause their deposition and contamination of the reaction product.

In still other chemical reactions certain reactants are dissolved in a solvent and caused to react forming an insoluble product. In some such cases the reaction is not carried to completion, either by operation of the laws of chemical equilibrium or by express design of the operator, and it becomes advisable to recover the unreacted constituents with their solvent and reuse them in the process. A similar case arises where an excess of a particular chemical is maintained in the reaction mixture to provide a high concentration of a particular ion or for an analogous purpose.

For reasons of economy it is also desirable to carry out chemical reactions in a continuous or substantially continuous manner so that a maximum of production will be achieved with a minimum of equipment and labor. It is also desirable that the chemical reaction be carried out with a high yield without loss of chemicals from the process.

One of the objects of the present invention is therefore to provide apparatus particularly adapted to handle highly volatile liquids while maintaining them throughout the reaction under pressures sufficiently great to keep them in a liquid condition. Another object of the invention is to provide apparatus wherein a chemical reaction may be conducted, the reaction product separated and the unreacted constituents returned to the process without loss. Still another object of the invention is to provide apparatus particularly adapted to be operated in a continuous or substantially continuous manner wherein the reaction mixture is maintained under pressure at all times, the reaction product separated and the mother liquor returned to the process for reuse therein. Still another object of the invention is to provide apparatus wherein chemical reactions may be carried out economically with high overall yields and with the avoidance of undesirable by-products which might be formed in the reaction and contaminate the product. Other objects of our invention will appear hereinafter.

Although the apparatus to be specifically described herein is useful for carrying out a wide variety of chemical reactions in liquid phase, the apparatus is particularly useful when employing highly volatile solvents such as $CO_2$, $SO_2$ and ammonia in liquid phase at room temperatures or higher. By maintaining the reaction mixture under pressure at all times it is possible to employ the apparatus with many volatile chemical substances. The apparatus is best suited, however, for those reactions in which a mixture of reactants in liquid form is heated under pressure for a length of time necessary to form a reaction product, which product is insoluble upon cooling the reaction mixture. The manufacture of guanidine nitrate by heating ammonium nitrate with dicyandiamide or cyanamide in water or aqueous ammonia solution may be mentioned as an example of such a process which can be very conveniently carried out in our apparatus. Another process which may be carried out in our apparatus to great advantage is the preparation of melamine by heating dicyandiamide dissolved in liquid ammonia as described and claimed in our copending application Serial No. 446,158, filed June 6, 1942. The preparation of other chemicals may also be carried out in our apparatus with or without suitable modifications thereof.

Our invention will now be described in greater particularity by reference to the drawings which show one of the prefered embodiments thereof. In the drawings:

Fig. 1 is a perspective view of apparatus particularly suited for the production of melamine by heating dicyandiamide dissolved in liquid ammonia;

Fig. 2 is an elevational view with parts cut away showing details of the dissolver 2 of Fig. 1. Since this particular dissolving apparatus embodies novel and useful features, it is described and claimed more particularly in the application of one of us, William F. Caldwell, Serial No. 446,157, filed June 6, 1942.

Fig. 3 is an elevational view with parts cut away showing details of the filter employed in the apparatus shown in Fig. 1. This particular filter is also new and possesses novel and useful features, and is described and claimed more specifically in the copending application of one of us, William F. Caldwell, Serial No. 446,159, filed June 6, 1942.

Referring to Fig. 1, there is shown a mother liquor tank 1, a dissolver 2, a storage tank 3, high pressure pump 4, reaction tubes 5, cooling tank 7 and filters 8 and 9, which parts include the most essential elements of the apparatus to be described.

Mother liquor tank 1 is simply a closed pressure vessel of stainless steel, or other strong, corrosion-resistant material, and is fitted with heating or cooling coils 11, sampling tube 13, inlet line 14, outlet line 15, pressure equalizing line 16 and circulation line 17. As will appear hereinafter, this tank serves the principal function of holding the mother liquor recycled from the process.

The dissolving tank 2 is shown in detail in Fig. 2 and reference is made thereto. This vessel is constructed of strong, corrosion-resistant material, and is also adapted to be operated under pressure. It is fitted with an easily removable cover 20 which can be taken off to permit the introduction of chemicals. A similar closure 21 may be provided at the lower end of the tank and fitted with a drain pipe 22 and valve 23 which permits cleaning of the vessel when desired. Heating or cooling coils 24 may be fitted in the tank as indicated. Relief valve 25 is also provided with an outlet line 26 to some point removed from the operating zone. This valve may be set to relieve the pressure in the tank at whatever value deemed necessary by the operator.

The liquid reaction medium or liquid reactants may be introduced into the tank through inlet pipe 27. The inlet pipe 27 enters the dissolver through a bushing 28 welded to the inlet pipe. The assembly is then tightly screwed into a threaded hole tapped in the tank as shown. Inside the dissolver, the inlet pipe is positioned substantially parallel to the axis of the tank and is preferably close to its wall. Inlet pipe 27 is closed at its lower end 29 and has a series of spaced openings 30, as shown in the drawings, positioned in such a way that the liquid passing into the dissolver is forced from the inlet pipe in a strong stream, substantially tangential to the wall of the tank. Drilled holes, slits or openings of other shapes designed to give a high velocity flow from the inlet pipe may be provided and positioned so as to discharge the incoming liquor in a tangential direction with respect to the walls of the dissolver.

An outlet line 31 enters the dissolver from the bottom through a bushing 32 as shown in the drawings. This outlet pipe is also positioned substantially parallel with the axis of the tank, is closed at its upper end 33 and has a number of spaced outlet holes 34. These outlets may be slits as in the drawings, may be drilled holes; or when the material being dissolved is of small particle size, the pipe with suitable perforations therein, may be covered with filter cloth of cotton, stainless steel, woven glass, or other corrosion-resistant material.

The storage tank 3 is simply a pressure vessel of corrosion-resistant material with heating or cooling coils 36, a sampling line 37, inlet line 38, outlet line 39 and pressed equalizing line 40. The function of this vessel is to hold a body of the liquid reaction mixture so that the process may be operated continuously while another batch of solution is being prepared in the dissolver, and mother liquor tank.

Since the apparatus to be specifically described is particularly useful in the production of melamine by heating dicyandiamide dissolved in liquid ammonia, the operation of the apparatus in conjunction with the preparation of this material will be described. The ammoniacal dicyandiamide solution used in this process may be prepared as follows:

With all valves closed, the cover 20 of the dissolver is removed and a weighed quantity of dicyandiamide is added to the vessel. The cover is then tightly sealed and valves 41 and 42 opened. Valve 43 of the mother liquor tank, which contains a quantity of mother liquor or liquid ammonia, is opened and valve 44 is partly opened. Circulating pump 46 is then started and ammoniacal liquor withdrawn from the mother liquor tank through valve 43, and line 47, and pumped through lines 48, and 49, valve 41 and line 27 into the dissolver. As the liquor is forced through the openings 30, (Fig. 2) of the inlet tube in the dissolver, it is given a circular motion. The swirling liquor in the tank dissolves part of the dicyandiamide and leaves through outlet line 31. The circulation of ammoniacal liquor through the dissolver is maintained until a sample of liquor withdrawn from the system shows that it contains sufficient dicyandiamide for the purpose, that is from about 25 to 70% dicyandiamide on the total weight of the liquor. In order to handle a larger volume of liquor, valve 44 is partially opened as previously mentioned and a part of the circulating liquor returns to the mother liquor tank through line 17, where it mixes with the liquor contained therein. When the liquor has been built up to a desired concentration of dicyandiamide, the valve 41 is closed and the liquor remaining in the dissolver is pumped into the mother liquor tank. Valve 42 may then be closed and the cover of the dissolver removed and an additional charge of dicyandiamide added.

A desired amount of the liquor in the mother liquor tank may now be pumped into the storage tank by closing valve 44 and opening valve 51. A pressure equalizing line 16, 40 with suitably positioned valves 52, 53 and 54 is provided in the system to equalize the pressures between the various tanks, thus facilitating discharge of liquor from one to the other as desired. Sight glasses (not shown) may, of course, be provided on each of the tanks to indicate the level of the liquid contents therein.

Having thus obtained an ammoniacal solution of dicyandiamide of desired strength, the solution is withdrawn through valve 39, line 61, to the high pressure pump 4, which forces the solution through line 62 and the reaction tubes 6. The reaction tubes may consist simply of stainless steel pipes forming a reaction zone in which the conversion to melamine occurs. The pipes may be heated by steam or Dowtherm vapors flowing through header 63 into the jackets 64 surrounding the reaction tubes. The condensate may be removed through header 65 as shown. The size and length of the pipes forming the reaction zone are dependent upon the capacity of the apparatus and should be of sufficient volume to allow the ammoniacal liquor to remain in the reaction tubes at 110–160° C. for 10–60 minutes. Of course, when employing the apparatus for carrying out other reactions, different temperatures and reaction times will be found necessary. Accordingly, the size and length of the reaction tubes will be governed by the particular reaction being carried out therein. A section of the tubing provided with a cooling jacket 66 may in some cases be desirable.

After passing through the reaction tubes, the liquor is discharged into a cooling vessel 7. The particular cooling vessel shown is a pressure autoclave fitted with cooling coils 72, through which cold water or brine may circulate, and a powerful agitator 73. The degree of cooling in the cooling vessel should be sufficient to cause the crystallization from the solution of most of the melamine or other crystalline product in other processes in the ammoniacal liquor, without causing the precipitation of unreacted dicyandiamide and intermediate conversion products. In the preparation of melamine, temperatures ranging from 10 to about 30° C. have been found suitable for this purpose. In order to reduce the working pressure in the cooling vessel it is desirable in some cases, particularly in the manufacture of melamine, to place a pressure relief valve 70 in the line before discharging the liquor into the cooling vessel. This makes it possible to build the cooler and filter of lighter weight materials. This relief valve may, however, in some cases be located on the cooling vessel itself, on the line to the filter, or even after the filter if desired. Ordinarily in the manufacture of melamine, the pressure in the cooling tank ranges from about 200 to 600 pounds per square inch.

As the pressure in the cooling vessel is ordinarily considerably lower than the pressure in the reaction tubes, failure of the relief valve to close would result in a decrease of pressure in the reaction zone with vaporization of the ammoniacal liquor. Should this happen, melamine would deposit in the tubes and might prevent further circulation of liquor. To avoid this possibility, we maintain a body of ammoniacal liquor in vessel 80. Ordinarily this vessel is kept about half full of ammonia liquor with an overlying body of nitrogen or other inert gas, the relative amounts of which may be determined by means of a sight glass 81. Inert gas may be supplied as required through line 82. Should the relief valve remain open for a period of time longer than is necessary to relieve the pressure in the reaction tubes, the inert gas over the body of ammoniacal liquor in vessel 80 forces this liquor into the reaction zone through line 83 at a pressure sufficiently high to prevent vaporization of ammonia therein. Accordingly it will be seen that this arrangement is of importance in maintaining continuous flow of liquor through the reaction zone. This system also has the further function of acting as a surge tank in absorbing hydraulic impulses transmitted to the liquor by the reciprocating high pressure pump 4.

The crystals formed in the mother liquor upon cooling are removed by filtration in one of the specially designed filters shown in detail in Fig. 3. Referring to this figure it will be seen that the filter consists essentially of a substantially cylindrical casing 85 of relatively small internal diameter, strongly constructed of steel or a corrosion-resistant alloy. The casing may be fitted with a cooling jacket 86 forming a space 87 in which water, brine or other cooling liquid may circulate around the filter casing. In some cases it may be desirable to introduce a heated liquid into the jacketed space when filtering liquids which must be kept hot.

Inside the filter a tubular filtering element 88 is positioned spaced apart from the interior wall of the filter and substantially in its axis as shown. The tubular filtering element may comprise a pipe closed at its lower end 89 and having perforations 90 therein of desired shape. The perforated pipe may be covered with stainless steel screen 91 of suitable mesh which may in turn be covered with filter cloth 92. The filtering element is held in place by bushing 93, screwed into the casing head 94, engaging lugs 95 which are an integral part of the filtering element. A suitable gasket 96 is provided to insure a tight closure of the filter. The filtering element continues through the bushing 93 as an imperforate pipe 97, and may connect to a lead-off filtrate pipe 98, by means of a union or in the manner shown in the drawings.

The mother liquor with suspended melamine therein enters the filter through line 99 tangentially as shown. The liquor is given a swirling motion in the filter which tends to throw the particles of melamine to the outer walls of the filter away from the filtering screen thus decreasing the tendency of the filter cake to build up on the filtering element. The liquor passes through the filter cloth into the pipe 88 and out into line 98 through valve 100, relief valve 101 and is then returned to the mother liquor tank for re-use through line 14.

When the filter 8 is filled with melamine, which may be determined by noting the difference in pressures between the outlet and inlet sides thereof, the adjoining filter 9 of similar construction may be placed in action by opening valves 102, 103 and 104 and closing valves 100 and 105. The melamine in the filter may be washed with liquid ammonia, passed through line 106, valves 107 and 108 into the filter. Liquid ammonia passes through the filtering element and out through line 109. The wash liquor may be collected in a separate vessel (not shown) or may be added to the liquid in the mother liquor tank as make-up ammonia through valves 100, 101 and line 14.

The washed melamine may then be discharged from the filter by merely opening valves 108 and 110. Opening of the filter to the atmosphere releases the pressure on the ammonia in the filter cake, causing it to vaporize and blow out of the filter carrying with it the melamine crystals. We have found that while the amount of ammonia in the melamine filter cake is relatively small, it is nevertheless sufficient to thoroughly disintegrate the cake and force it from the filter. Compressed air may also be utilized to blow the filter cake from the filter if desired. When the filter 9 is filled, the flow of mother liquor with its melamine is changed back to filter 8 and the filter cake in filter 9 is washed and the melamine discharged in the manner just described.

The melamine discharged from the filter is recovered in tank 120 which is ordinarily maintained about half full of water. After the melamine has been blown into the water, the valve 121 is closed; valve 122 is opened; and circulating pump 123 placed in operation. The aqueous slurry of melamine is withdrawn from the discharge tank through line 124 and forced through lines 125 and 126 back into the tank tangentially as shown. The swirling motion thus created thoroughly washes the melamine with the water contained in the tank. After a few minutes of this operation valve 121 is opened; valve 122 is closed; and the pump forces the washed melamine slurry to filter press 127. The melamine filter cake may then be washed with water, discharged, and dried.

Although we have described our new apparatus with particular reference to the production of melamine, it will be understood that many obvious modifications may be made therein by those skilled in the art to adapt it to other particular processes without departing from the essential novel features thereof as set forth in the appended claims.

What we claim is:

1. Apparatus for conducting chemical reactions in liquid phase under pressure comprising a series of elements connected in a circuit for successive functioning in continuous flow including a dissolving vessel constructed for the admission of solids and retention of pressure, an accumulator vessel, a pump, a jacketed pipe of relatively long extent, a reducing valve, a vessel fitted with agitating and heat exchange means, a closed filter, and a return filtrate conduit.

2. Apparatus for conducting chemical reactions in liquid phase under pressure comprising a series of elements connected in a circuit for successive functioning in continuous flow including a dissolving vessel constructed for the admission of solids and retention of pressure, a return filtrate pressure vessel, pipes constituting a circulation system connecting said dissolving vessel and return filtrate vessel, a pump in said system for circulating liquor between the vessels and to an accumulator vessel, a second pump, a jacketed pipe of relatively long extent, a reducing valve discharging directly into a vessel fitted with agitating and heat exchange means, a closed filter, and a return filtrate conduit.

3. Apparatus for conducting chemical reactions in liquid phase under pressure comprising a series of elements connected in a circuit for successive functioning in continuous flow including a dissolving vessel constructed for the admission of solids and retention of pressure, a return filtrate pressure vessel, pipes constituting a circulation system connecting said dissolving vessel and return filtrate vessel, a pump in said system for circulating liquor between the vessels and to an accumulator vessel, a second pump, a jacketed pipe of relatively long extent, a surge tank between said pump and jacketed pipe, a reducing valve discharging directly into a vessel fitted with agitating and heat exchange means, a closed filter, and a return filtrate conduit.

WILLIAM F. CALDWELL.
ROBERT C. SWAIN.
JOSEPH H. PADEN.